(12) United States Patent
Abdalla et al.

(10) Patent No.: US 11,529,572 B2
(45) Date of Patent: Dec. 20, 2022

(54) INTEGRAL FLOW STRUCTURE WITHIN A CONTAINMENT COVER

(71) Applicant: CUMMINS FILTRATION IP, INC., Columbus, IN (US)

(72) Inventors: Wassem Abdalla, Cookeville, TN (US); Joshua Luther Young, Livingston, TN (US); Vaibhav Pimpalte, Maharashtra (IN); Peter K. Herman, Stoughton, WI (US); Ismail C. Bagci, Cookeville, TN (US); Jithin Benjamin, Columbus, IN (US)

(73) Assignee: Cummins Filtration IP, Inc., Columbus, IN (US)

( * ) Notice: Subject to any disclaimer, the term of this patent is extended or adjusted under 35 U.S.C. 154(b) by 90 days.

(21) Appl. No.: 16/768,728

(22) PCT Filed: Dec. 5, 2017

(86) PCT No.: PCT/US2017/064682
§ 371 (c)(1),
(2) Date: Jun. 1, 2020

(87) PCT Pub. No.: WO2019/112563
PCT Pub. Date: Jun. 13, 2019

(65) Prior Publication Data
US 2021/0170313 A1    Jun. 10, 2021

(51) Int. Cl.
   *B01D 29/92*    (2006.01)
   *B01D 35/30*    (2006.01)
   (Continued)

(52) U.S. Cl.
CPC ............ *B01D 29/92* (2013.01); *B01D 29/114* (2013.01); *B01D 29/117* (2013.01); *B01D 29/90* (2013.01);
(Continued)

(58) Field of Classification Search
CPC .... B01D 29/92; B01D 29/114; B01D 29/117; B01D 29/90; B01D 35/30;
(Continued)

(56) References Cited

U.S. PATENT DOCUMENTS 3,857,687 A    12/1974    Hamilton et al.
4,336,043 A    6/1982    Aonuma et al.
(Continued)

FOREIGN PATENT DOCUMENTS

CA      2374697      9/2002
CN      1708340 A      12/2005
(Continued)

OTHER PUBLICATIONS

International Search Report and Written Opinion issued for PCT/US2017/064667, dated Feb. 1, 2018, 10 pages.
(Continued)

*Primary Examiner* — Madeline Gonzalez
(74) *Attorney, Agent, or Firm* — Foley & Lardner LLP

(57) ABSTRACT

A filtration assembly includes a housing. The housing includes a first housing for fluid and a second housing opening for fluid. A containment cover is removably coupled to the housing. The containment cover defines a cover opening, a cover surface, and a flow passage. The cover opening is in fluid communication with the housing. The cover surface is substantially continuous around a circumference of the containment cover. The cover surface includes an open portion in fluid communication with the second housing opening. The flow passage is formed by a first passage surface and a second passage surface. The flow passage includes a first end in fluid communication with the cover opening. A second end is in fluid communication with
(Continued)

the second housing opening through the open portion of the cover surface. The flow passage extends radially outward from the cover opening.

25 Claims, 10 Drawing Sheets

(51) Int. Cl.
  *B01D 29/11* (2006.01)
  *B01D 29/90* (2006.01)
  *F02M 37/22* (2019.01)
(52) U.S. Cl.
  CPC ........ *B01D 35/30* (2013.01); *B01D 2201/302* (2013.01); *B01D 2201/306* (2013.01); *F02M 37/22* (2013.01)
(58) Field of Classification Search
  CPC ........ B01D 2201/302; B01D 2201/306; B01D 35/005; B01D 46/2411; B01D 46/0002; B01D 46/0004; B01D 46/0039; F02M 37/22; F01N 2450/30; F01N 3/021; F01N 13/08; Y02T 10/12
  USPC .............................. 210/437, 493.2, 455, 450
  See application file for complete search history.

(56) References Cited

U.S. PATENT DOCUMENTS

| | | | |
|---|---|---|---|
| 4,681,609 A | 7/1987 | Howeth | |
| 4,775,398 A | 10/1988 | Howeth | |
| 5,017,285 A | 5/1991 | Janik et al. | |
| 5,301,958 A | 4/1994 | Covington | |
| 5,304,312 A | 4/1994 | Forster et al. | |
| 5,342,519 A | 8/1994 | Friedmann et al. | |
| 5,814,219 A | 9/1998 | Friedmann et al. | |
| 6,006,924 A | 12/1999 | Sandford | |
| 6,113,781 A | 9/2000 | Popoff et al. | |
| 6,149,700 A | 11/2000 | Morgan et al. | |
| 6,158,592 A | 12/2000 | Reinhart et al. | |
| 6,299,661 B1 | 10/2001 | Bloomer | |
| 6,328,883 B1 | 12/2001 | Jensen | |
| 6,334,881 B1 | 1/2002 | Giannetta et al. | |
| 2003/0132158 A1 | 7/2003 | Clausen et al. | |
| 2004/0255783 A1 | 12/2004 | Graham et al. | |
| 2006/0157403 A1 | 7/2006 | Harder et al. | |
| 2007/0163947 A1 | 7/2007 | Clausen et al. | |
| 2009/0127170 A1 | 5/2009 | Kolczyk et al. | |
| 2009/0308802 A1 | 12/2009 | Beard et al. | |
| 2010/0044295 A1 | 2/2010 | Honermann et al. | |
| 2010/0192529 A1 | 8/2010 | Schuster | |
| 2010/0224539 A1 | 9/2010 | Luther et al. | |
| 2012/0223006 A1 | 9/2012 | Sann et al. | |
| 2013/0327696 A1 | 12/2013 | Bagci et al. | |
| 2014/0217001 A1 | 8/2014 | Vercammen | |
| 2014/0305858 A1 | 10/2014 | Downs et al. | |
| 2015/0202556 A1* | 7/2015 | Hawkins .............. B01D 35/153 210/450 |
| 2016/0023142 A1 | 1/2016 | Arakeri et al. | |
| 2016/0184750 A1 | 6/2016 | Eberle et al. | |
| 2017/0014738 A1 | 1/2017 | Malgorn et al. | |
| 2017/0080365 A1 | 3/2017 | Morris et al. | |
| 2017/0120168 A1 | 5/2017 | Stamey et al. | |

FOREIGN PATENT DOCUMENTS

| | | |
|---|---|---|
| CN | 101084050 A | 12/2007 |
| CN | 201818404 | 8/2008 |
| CN | 201855623 | 5/2011 |
| CN | 102264446 A | 11/2011 |
| CN | 102872644 | 1/2013 |
| CN | 201094880 | 1/2013 |
| CN | 104780992 A | 7/2015 |
| CN | 105229294 | 1/2016 |
| CN | 206419137 | 8/2017 |
| DE | 10 2011 010 076 | 6/2009 |
| DE | 10 2007 062 100 | 6/2011 |
| DE | 202007018076 U1 | 8/2012 |
| EP | 1 008 375 | 6/2009 |
| GB | 1 336 647 | 11/1973 |
| GB | 1 488 500 A | 10/1977 |
| WO | WO-2008/134494 | 11/2008 |
| WO | WO-2012/025640 | 3/2012 |
| WO | WO-2018/134626 | 7/2018 |

OTHER PUBLICATIONS

International Search Report and Written Opinion issued for PCT/US2017/064682, dated Feb. 12, 2018, 8 pages.
International Search Report and Written Opinion issued for PCT/US2017064665, dated Feb. 16, 2018, 16 pages.
Non-Final Office Action issued for U.S. Appl. No. 16/768,745 dated Jan. 12, 2022, 24 pages.
First Office Action for Chinese Patent App. No. 201780098105.7 dated Nov. 9, 2020, 9 pages (with translation).
First Office Action issued for Chinese dated Jun. 24, 2021, with English language translation 23 pages.
Office Action issued for Chinese Patent Application No. CN 2021102801678 dated Feb. 24, 2022, 10 pages.

* cited by examiner

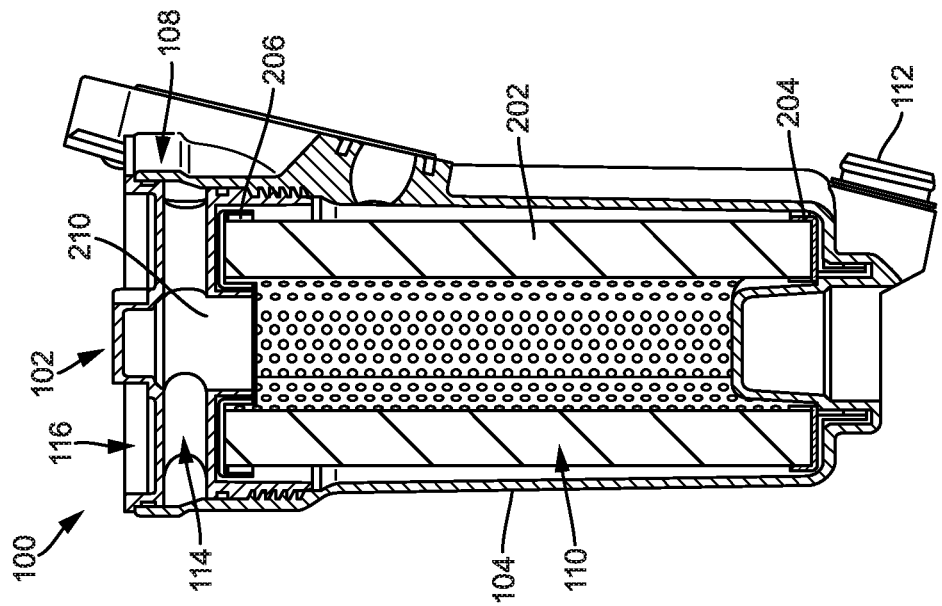
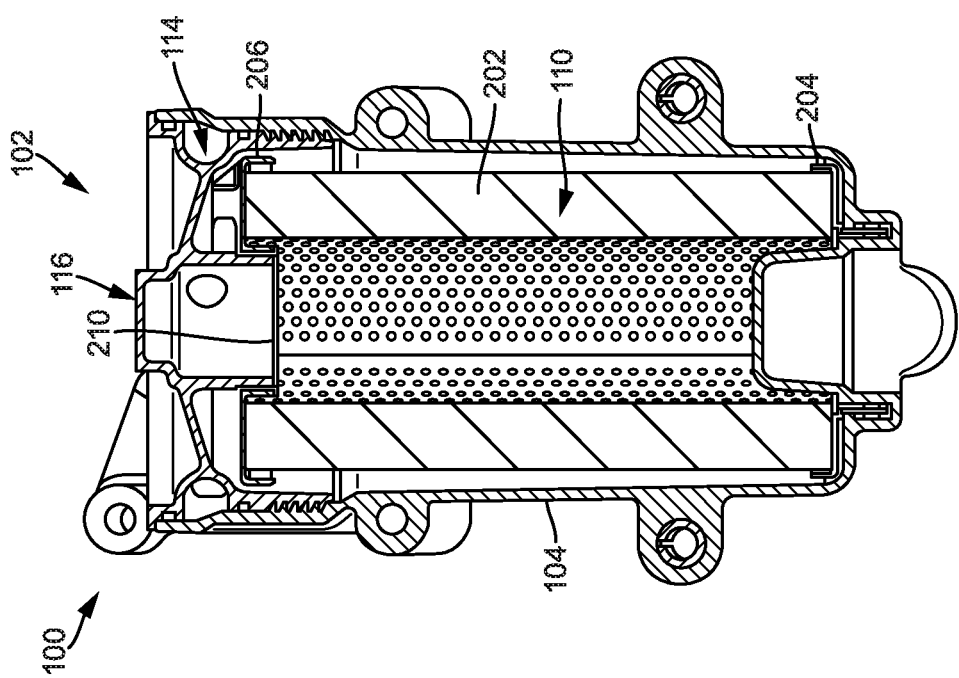
FIG. 2A
FIG. 2B

INTEGRAL FLOW STRUCTURE WITHIN A CONTAINMENT COVER

CROSS-REFERENCE TO RELATED PATENT APPLICATIONS

This application is the U.S. national phase of PCT Application No. PCT/US2017/064682, filed Dec. 5, 2017, the contents of which are incorporated herein by reference.

TECHNICAL FIELD

The present invention relates generally to filter assemblies for filtering fluids in internal combustion engine systems.

BACKGROUND

Fluid filter elements are employed in protected systems of engines. Such filter elements are used for fluid filtration, including, for example, filtration of oil, fuel, coolant, air, exhaust fluids, hydraulic fluids, crankcase ventilation and condensates, and intake air. For example, internal combustion engines generally combust a mixture of fuel (e.g., gasoline, diesel, natural gas, etc.) and air. Prior to entering the engine, fluids such as fuel, oil, and air are typically passed through filter elements to remove contaminants (e.g., particulates, dust, water, etc.) from the fluids prior to delivery to the engine.

Improvements can be made to the flow structure to and from a fluid filter element to reduce the restriction level of flow structures to and from the fluid filter elements.

SUMMARY

According to a first set of embodiments, a filtration assembly includes a housing. The housing includes a first housing opening for fluid and a second housing opening for fluid. A containment cover is removably coupled to the housing. The containment cover defines a cover opening, a cover surface, and a flow passage. The cover opening is in fluid communication with the housing. The cover surface is substantially continuous around a circumference of the containment cover. The cover surface includes an open portion in fluid communication with the second housing opening. The flow passage is formed by a first passage surface and a second passage surface. The flow passage includes a first end in fluid communication with the cover opening. A second end is in fluid communication with the second housing opening through the open portion of the cover surface. The flow passage extends radially outward from the cover opening.

According to a second set of embodiments, a filtration assembly includes a housing. The housing includes a first housing opening and second housing opening. A fluid filter element is removably installed within the filter housing. The fluid filter element includes filtration media comprising a filtered fluid side, an unfiltered fluid side, and a center compartment. A containment cover is removably coupled to the housing. The containment cover defines a cover opening, a surface, and a flow passage. The cover opening is in fluid communication with the center compartment of the filtration media. The cover surface is substantially continuous around a circumference of the containment cover. The cover surface includes an open portion in fluid communication with the second housing opening. The flow passage is formed by a first passage surface and a second passage surface. The flow passage includes a first end in fluid communication with the cover opening. A second end is in fluid communication with the second housing opening through the open portion of the cover surface. The flow passage extends radially outward from the cover opening.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2A shows a cross-sectional view of the filtration assembly of FIG. 1A.

FIG. 2B shows a cross-sectional view of the filtration assembly of FIG. 1A.

DETAILED DESCRIPTION

Referring to the figures generally, a filtration system having a filter element removably received in a housing and a containment cover that includes at least one integral flow passage is described. The integral flow passage within the containment cover facilitates fluid flow filtered by the filter element through the containment cover, and out of the filtration system via an outlet. Various embodiments include a wide variety of orientations and number of integral flow passages integrally formed with the containment cover. As will be appreciated, the flow passages may be embodied in orientations different (e.g., rotated clockwise by an amount) from those described in the embodiments below without departing from the spirit or novel characteristic thereof. The filter element is placed into the filter housing and a seal member, for example an O-ring, is used to separate the dirty side from the clean side of the assembly. The containment cover is then coupled to the filter housing, sealing against the filter element. In some embodiments, the containment cover is integrated into the filter element by acting as the endplate of the filter element. The containment cover receives filtered flow through a substantially central portion of the containment cover and directs the flow radially outward through one or more passages formed in the containment cover. The flow passage is configured to reduce overall flow restriction and pressure drop of the fluid flow through the containment cover. In some embodiments, the containment cover includes a removable lid that attaches to the containment cover.

The filtration systems described herein can be used in any number of fluid systems including, but not limited to, a fuel or oil filtration system. For example, on an engine such as a diesel or gasoline engine, a hydraulic fluid filtration system in a hydraulic system, other engine fluid filtration systems on diesel or gasoline engines, as well as filtration systems used in non-engine applications. In one exemplary application, the filter system described herein is used in a fuel system for filtering fuel, for example diesel fuel. While the filtration systems shown and described herein are described as a "top load" design, alternative designs, for example, bottom loads are possible. While the foregoing embodiments describe a containment cover for receiving fluid from a filtration system with an outside-in flow arrangement, the embodiments may be readily used with other types of filtration systems, including those that have inside-out flow. Further, while the containment cover is described as directing the flow radially outward through one or more flow passages, the containment cover may be readily used to direct flow radially inward through one or more flow passages.

Figure 1B:
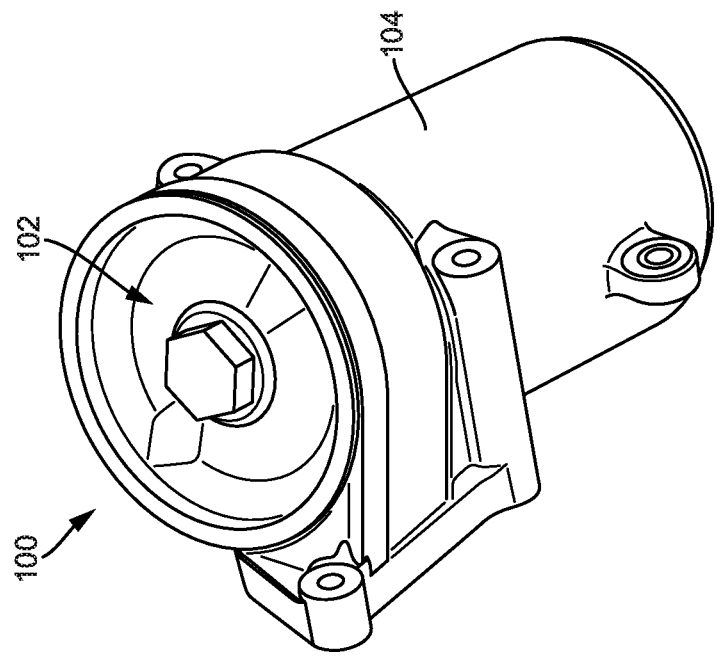
FIG. 1B shows a perspective view of the filtration assembly of FIG. 1A.
Figure 1A:
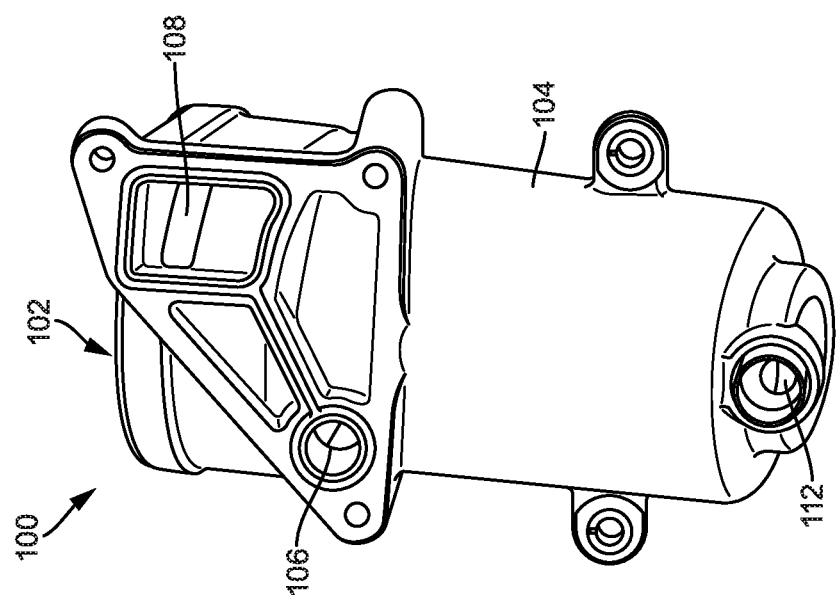
FIG. 1A shows a perspective view of a filtration system including an integral flow passage within a containment cover, according to an example embodiment.

Referring to FIGS. 1A and 1B, a pair of perspective views of a filtration system 100 that includes a containment cover 102 with an integral flow passage is shown, according to an example embodiment. The filtration system 100 includes a housing 104, a filter element 110 (shown, for example, in FIGS. 2A-2B), and the containment cover 102 with an integral flow passage. The housing 104 includes a first housing opening 106, a second housing opening 108, a central compartment that receives the filter element 110, and a water sump outlet 112. As shown in FIGS. 1A and 1B, the first housing opening 106 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet. The housing 104 can be made of any material suitable for use in a fluid filter, for example metal or plastic. While the housing 104 is shown as cylindrical in shape, other housing shapes can be used. The filter element 110 includes filtration media 202, a first endplate 204, and second endplate 206. The first endplate 204 can be a closed endplate disposed on the bottom of the filter element 110. The second endplate 206 is an open endplate disposed on the top of the filter element 110 and in fluid communication with the containment cover 102 with the integral flow passage 114. In some arrangements, the first endplate 204 is also an open endplate with an interface to allow certain fluid to travel to a water sump. The filter element 110 filters fluid traveling through—from inside out in one embodiment—the filtration media 202, such that the filtered fluid is then located centrally inside of the filtration media 202. Because the second endplate 206 is open, the filtered fluid travels through the second endplate 206 to the central opening (e.g., cover opening) of the containment cover 102 with the integral flow passage.

FIGS. 2A and 2B show a cross-sectional view of the filtration system 100 of FIGS. 1A & 1B. The containment cover 102 defining the integral flow passage 114 is removably coupled to the housing 104, thereby sealing the filter element 110 received in the central compartment. As used herein, the term "integral flow passage" refers to the containment cover 102 having surfaces integrally formed with the containment cover 102 that are shaped and/or define a passage for the flow of fluid. The sealing engagement can be accomplished by, for example, a threaded members. In some embodiments, the containment cover 102 with the integral flow passage 114 may be integrated into the filter element by acting as the endplate (e.g., second endplate 206) of the filter element. The containment cover 102 comprises a flow passage 114 that is in fluid communication with the open end of the filter element 110. The integral flow passage 114 provides an improved flow passage which reduces restriction and pressure drop by incorporating a wide variety of passage configurations, as described in greater detail below. The fluid filtered by the filter element 110 flows through a center portion (e.g., cover opening) 210 of the containment cover 102 where the fluid is directed radially outward into the integral flow passage 114. In some embodiments, the integral flow passage 114 includes a fanning outlet to provide easier clocking (e.g., an annular ring flow passage) of the passage of the integral flow passage 114, thereby reducing flow restriction through the containment cover 102 with the integral flow passage 114. The filtration system 100 may include concentric seal members (e.g., O-rings) that provide compression of the filter element 110.

Expanding on the filter element 110, a first endplate 204 is sealingly attached to the first end of the filtration media 202 and a second endplate 206 is sealingly attached to the second end of the filtration media 202. Although the filtration media 202 is illustrated in the form of a ring, filtration media 202 that is not of ring-shape design can be used, such as a folded filtration media pack and other non-ring-shaped filtration media designs. In addition, the ring-shaped media can take on any shape, for example a cylindrical ring, triangular ring, oval ring, or the like as long as it defines the central compartment of the housing.

Figure 3A:
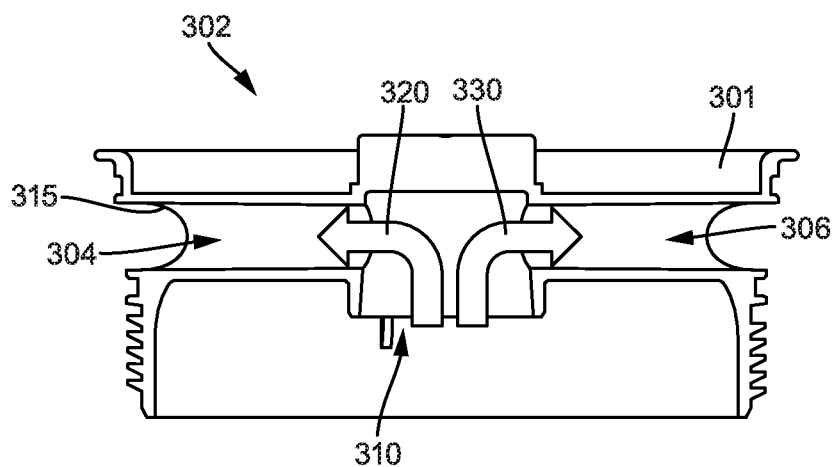
FIG. 3A shows a cross-sectional view of a containment cover with an integral dual flow passage, according to another example embodiment.
Figure 3B:
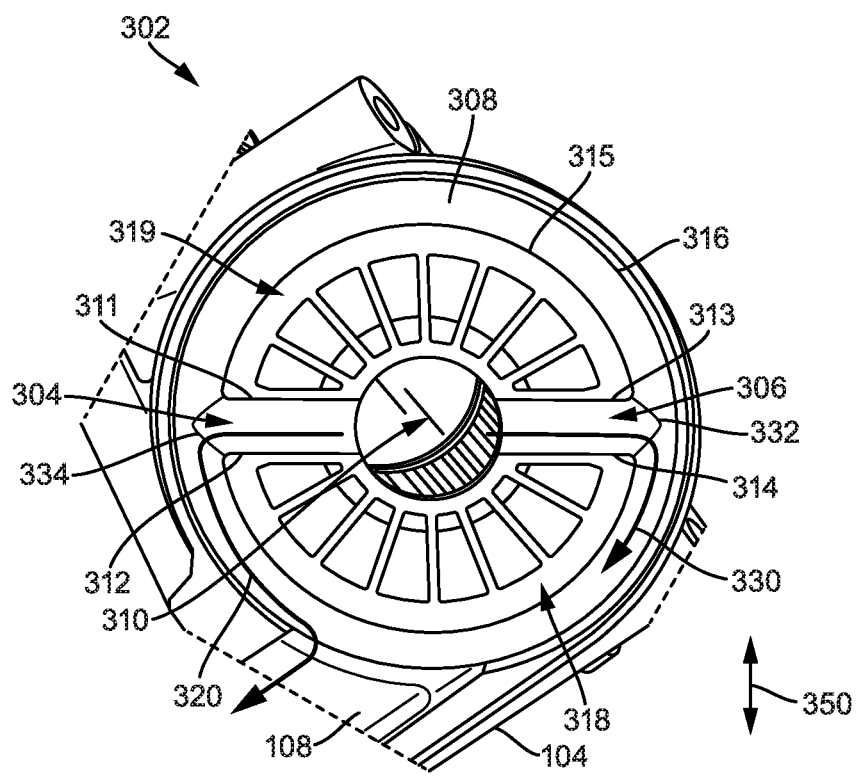
FIG. 3B shows a perspective view of the containment cover of FIG. 3A in a filtration system.

Referring to FIGS. 3A & 3B, a pair of cross-sectional views of containment cover 302 with an integral dual flow passage 304, 306 is shown, according to an example embodiment. The containment cover 302 can be used in place of the containment cover 102 of FIG. 1A. Accordingly, like numbering is used to designate like parts between the containment cover 302 and the integral flow passage 114. The containment cover 302 includes a substantially central opening (e.g., cover opening) 310, a first flow passage (e.g., first duct) 304, a second flow passage (e.g., second duct) 306, an annular passage (e.g., ring) 308 adjacent to a perimeter edge of the containment cover 302, and a lid 301. The substantially central opening 310 is in fluid communication with a first end of each the first flow passage 304 and the second flow passage 306. The first flow passage 304 and the second flow passage 306 define a diameter of a second surface 315 (which is hemispherical in a particular embodiment). The annular passage 308 is in fluid communication with a second end of each the first flow passage 304 and the second flow passage 306. The lid 301 may be integrally formed with the containment cover 302 or may be removably coupled to the containment cover 302.

The annular passage 308 is a circumferentially continuous passage provided in the containment cover 302 adjacent to a perimeter edge of the containment cover 302. The annular passage 308 is formed by a pair of concentric surfaces, a first surface 316 and a second surface 315 spaced inward from the first surface 316 (which may also possess a curved, hemispherical contour in particular embodiments). The second surface 315 is substantially continuous around the circumference, with portions open for fluid communication with the first flow passage 304 and the second flow passage 306. The second surface 315 forms the perimeter edge of the containment cover 302 and comprises a substantially circular cross-section (e.g., c-shaped) having a side opening. The first surface 316 is substantially continuous around the circumference, with a portion of the first surface 316 open for fluid communication with the outlet 108. The first surface 316 is provided by an inner surface of the housing 104, wherein the installation of the containment cover 302 into the housing 104 forms a sealing engagement with the second surface 315 of the containment cover 302 and formation of the annular passage 308. In other words, the side opening of the second surface 315 is sealingly closed by the inner surface of the housing 104 when the containment cover 302 is installed into the housing 104. In some embodiments, the first surface 316 is formed on the containment cover 302. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

The first flow passage 304 and the second flow passage 306 are integrally formed in the containment cover 302 and extend radially in opposite directions away from the central opening 310 toward the annular passage 308. When the containment cover 302 is properly installed in the housing 104, the first flow passage 304 and the second flow passage 306 extend in a direction that is substantially perpendicular to a longitudinal axis 350 (defined by the outlet 108) of the containment cover 302. In other words, the flow passages 304, 306 extend in a radial direction substantially parallel to the face of the outlet 108. The first flow passage 304 is formed by a first surface 311 and a second surface 312 that extend from the central opening 310 toward the second surface 315 of the annular passage 308. The first surface 311 is substantially parallel to the second surface 312. The second flow passage 306 is formed by a third surface 313 and a fourth surface 314 that extend from the central opening 310 (in the opposite direction of the first surface 311 and second surface 312, respectively) toward the second surface 315 of the annular passage 308. The third surface 313 is substantially parallel to the fourth surface 314. As referenced herein, the formation of a passage by one or more surfaces can comprise a wide variety of passage cross-sectional shapes, for example, passages having circular, rectangular, oval, etc. cross-sectional shapes. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

As shown in FIG. 3B, a cross section of the containment cover 302 of FIG. 3A without the lid 301 is shown. A first semicircular portion 318 is formed between the second surface 312, the central opening 310, the fourth surface 314, and the second surface 315. The first semicircular portion 318 may be substantially solid or open. In some arrangements, the bottom of the first semicircular portion 318 is attached to the filter element 110 in place of the second endplate 206. A second semicircular portion 319 is formed between the first surface 311, the central opening 310, the third surface 313, and the second surface 315. The second semicircular portion 319 may be substantially solid or open. In some arrangements, the bottom of the second semicircular portion 319 is attached to the filter element 110 in place of the second endplate 206.

The first flow passage 304 and the second flow passage 306 are not aligned with the outlet 108. In other words, the outlet of each flow passage 304, 306 opens at a location away from the outlet 108 such that the filtered fluid must travel in the annular passage 308 to exit the containment cover 302. Specifically, the filtered fluid flows 320 through central opening 310, into the first flow passage 304, through first flow passage 304 formed by the first surface 311 and the second surface 312, and into the annular passage 308. The filtered fluid flows 320 may travel counterclockwise along the annular passage 308 formed by the second surface 315 and the first surface 316 to the outlet 108 (e.g., along the first semicircular portion 318). Alternatively, and depending on flow conditions, the filtered fluid flows 320 may travel clockwise along the annular passage 308 (e.g., along the second semicircular portion 319), combining with the filtered fluid flow 330 from the second flow passage 306, ultimately reaching the outlet 108.

Conversely, the filtered fluid flows 330 through central opening 310, into the second flow passage 306, through second flow passage 306 formed by the third surface 313 and the fourth surface 314, and into the annular passage 308. The filtered fluid flows 330 may travel clockwise along the annular passage 308 formed by the second surface 315 and the first surface 316 to the outlet 108 (e.g., along the first semicircular portion 318). Alternatively, and depending on flow conditions, the filtered fluid flows 330 may travel counter counterclockwise along the annular passage 308 (e.g., along the second semicircular portion 319), combining with the filtered fluid flow 320 from the first flow passage 304, ultimately reaching the outlet 108. In some embodiments, the first flow passage 304 and the second flow passage 306 may include indentations—along the various surfaces that form them—to bias the filtered fluid flows 320, 330 therethrough. For example, a curved indentation 334 on the first flow passage 304 angled counterclockwise to bias the filtered fluid flow 320 to the outlet 108. Further, a curved protrusion 332 on the second flow passage 306 angled clockwise to bias the filtered fluid flow 330 to the outlet 108. A wide variety of protrusions, indentations, or biasing surfaces may be used along or at the end of the first flow passage 304 and/or second flow passage 306 to bias filtered fluid flow 320, 330 therethrough. Under certain operating conditions (e.g., temperature, flow rate, pressure, etc.), the presence of two bends in the containment cover 302 can contribute to an increase in pressure drop across the containment cover.

Figure 4:
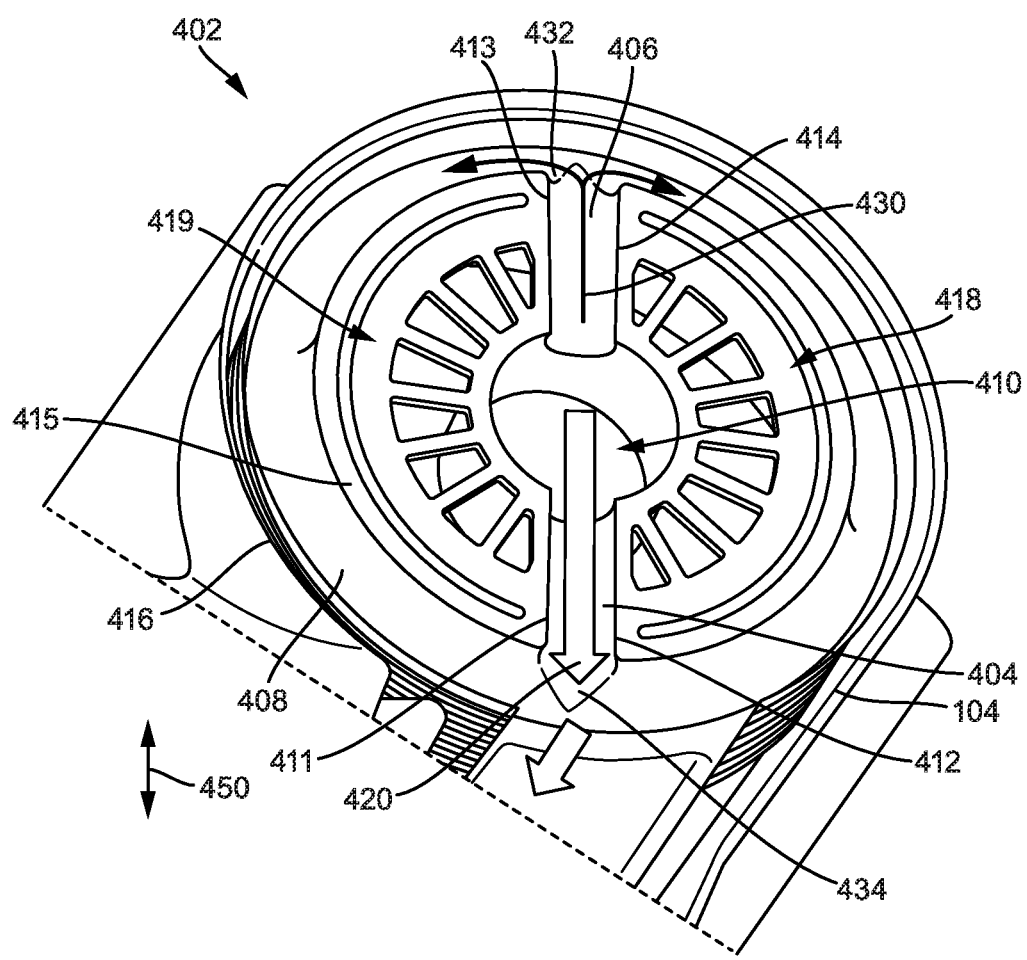
FIG. 4 shows a perspective view of a containment cover with an integral dual flow passage, according to another example embodiment.

Shown in FIG. 4 is a cross-sectional view of a containment cover 402 with an integral aligned dual flow passage 404, 406 is shown, according to another example embodiment. The containment cover 402 is similar to the containment cover 302 of FIG. 3A. A difference between the containment cover 402 and the containment cover 302 is the containment cover 402 is aligned with the outlet 108. Accordingly, like numbering is used to designate like parts between the containment cover 402 and the containment cover 302. The containment cover 402 includes a substantially central opening (e.g., cover opening) 410, a first flow passage (e.g., first duct) 404, a second flow passage (e.g., second duct) 406, and an annular passage (e.g., ring) 408 adjacent to a perimeter edge of the containment cover 402. The substantially central opening 410 is in fluid communication with a first end of each the first flow passage 404 and the second flow passage 406. The first flow passage 404 and the second flow passage 406 define a diameter of a second surface 415 (which may possess a curved, hemispherical contour in particular embodiments). The annular passage 408 is in fluid communication with a second end of each the first flow passage 404 and the second flow passage 406. As is readily apparent, due to the first flow passage 404 alignment, the first flow passage 404 is in direct fluid communication with the outlet 108, whereas the second flow passage 406 is in fluid communication with the outlet 108 via the annular passage 408.

The annular passage 408 is a circumferentially continuous passage provided in the containment cover 402 adjacent to a perimeter edge of the containment cover 402. The annular passage 408 is formed by a pair of concentric surfaces, a first surface 416 (which may possess a curved, hemispherical contour in particular embodiments) and the second surface 415 spaced inward from the first surface 416. The second surface 415 is substantially continuous around the circumference, with portions open for fluid communication with the first flow passage 404 and the second flow passage 406. The second surface 415 forms the perimeter edge of the containment cover 402 and comprises a substantially circular cross-section (e.g., c-shaped) having a side opening. The first surface 416 is substantially continuous around the circumference, with a portion of the first surface 416 open for fluid communication with the outlet 108. The first surface 416 is provided by an inner surface of the housing 104, wherein the installation of the containment cover 402 into the housing 104 forms a sealing engagement with the second surface 415 of the containment cover 402 and formation of the annular passage 408. In other words, the side opening of the second surface 415 is sealingly closed by the inner surface of the housing 104 when the containment cover 402 is installed into the housing 104. In some embodiments, the first surface 416 is formed on the containment cover 402. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

The first flow passage 404 and the second flow passage 406 are integrally formed in the containment cover 402 and extend radially in opposite directions away from the central opening 410 toward the annular passage 408. When the containment cover 302 is properly installed in the housing 104, the first flow passage 404 and the second flow passage 406 extend in a direction that is substantially parallel to a longitudinal axis 450 (defined by the outlet 108) of the containment cover 402. In other words, the flow passages 404, 406 extend in a radial direction substantially perpendicular to the face of the outlet 108. The first flow passage 404 is formed by a first surface 411 and a second surface 412 that extend from the central opening 410 toward the second surface 415 of the annular passage 408. The first surface 411 is substantially parallel to the second surface 412. The second flow passage 406 is formed by a third surface 413 and a fourth surface 414 that extend from the central opening 410 (in the opposite direction of the first surface 411 and second surface 412, respectively) toward the second surface 415 of the annular passage 408. The third surface 413 is substantially parallel to the fourth surface 414. As referenced herein, the passage formed by one or more surfaces can comprise a wide variety of passage cross-sectional shapes, for example, passages having circular, rectangular, oval, etc. cross-sectional shapes. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

As shown in FIG. 4, a cross section of the containment cover 402 without a lid is shown. As will be appreciated, a lid may be coupled to containment cover 402. A first semicircular portion 418 is formed between the second surface 412, the central opening 410, the fourth surface 414, and the second surface 415. The first semicircular portion 418 may be substantially solid or open. In some arrangements, the bottom of the first semicircular portion 418 is attached to the filter element 110 in place of the second endplate 206. A second semicircular portion 419 is formed between the first surface 411, the central opening 410, the third surface 413, and the second surface 415. The second semicircular portion 419 may be substantially solid or open. In some arrangements, the bottom of the second semicircular portion 419 is attached to the filter element 110 in place of the second endplate 206.

The first flow passage 404 is aligned with the outlet 108 and the second flow passage 406 is not aligned with the outlet 108. In other words, the outlet of first flow passage 404 opens at a location adjacent the outlet 108 and the second flow passage 406 opens at a location away from the outlet 108, such that the filtered fluid flow 430 must travel in the annular passage 408 to exit the containment cover 402. Specifically, the filtered fluid flows 420 through central opening 410, into the first flow passage 404, through first flow passage 404 formed by the first surface 411 and the second surface 412, into the annular passage 408 as it travels directly through the outlet 108. Under certain operating conditions, some of the filtered fluid flow 420 may travel clockwise or counterclockwise along the annular passage 408 before reaching the outlet 108. Conversely, the filtered fluid flows 430 through central opening 410, into the second flow passage 406, through second flow passage 406 formed by the third surface 413 and the fourth surface 414, and into the annular passage 408. The filtered fluid flows 430 may travel clockwise along the annular passage 408 formed by the second surface 415 and the first surface 416 to the outlet 108 (e.g., along the first semicircular portion 418) combining with the filtered fluid flow 420 from the first flow passage 404. Alternatively, and depending on flow conditions, the filtered fluid flows 430 may travel counterclockwise along the annular passage 408 (e.g., along the second semicircular portion 419), the outlet 108 combining with the filtered fluid flow 420 from the first flow passage 404.

In some embodiments, the first flow passage 404 and the second flow passage 406 may include indentations—along the various surfaces that form them—to bias the filtered fluid flows 420, 430 therethrough. For example, a v-shaped indentation as a biasing member 434 on the first flow passage 404 angled toward the outlet 108 to bias the filtered fluid flow 420 to the outlet 108. Further, a curved v-shaped protrusion as a biasing member 432 on the second flow passage 406 angled clockwise and counterclockwise to bias the filtered fluid flow 430 to the annular passage 408 and, ultimately, the outlet 108. A wide variety of protrusions, indentations, or biasing surfaces may be used along or at the end of the first flow passage 404 and/or second flow passage 406 to bias filtered fluid flow 420, 430 therethrough. Under certain operating conditions (e.g., temperature, flow rate, pressure, etc.), the alignment of the first flow passage 404 with the outlet 108 reduces pressure drop—compared to conventional covers—and reduces the overall pressure drop across the containment cover 402.

Figure 5A:
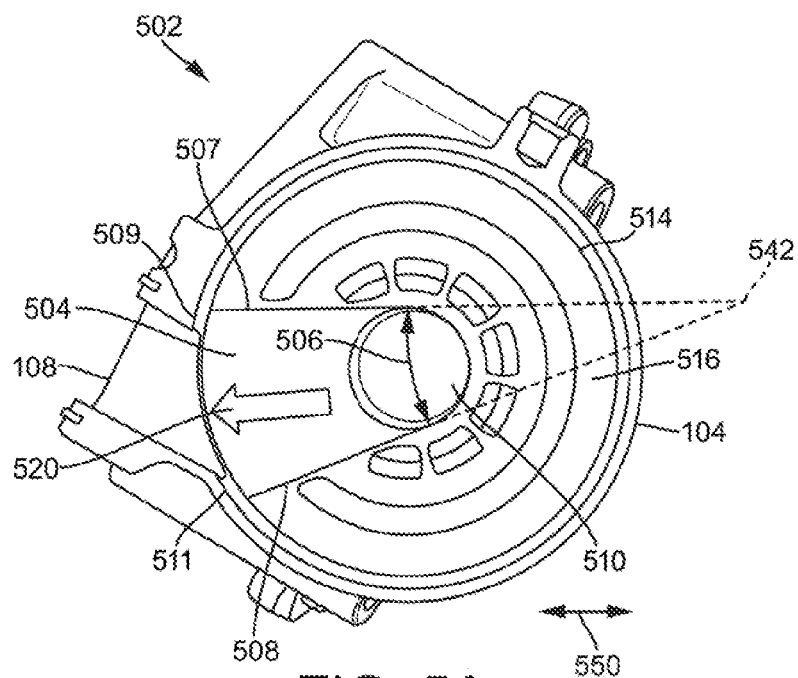
FIG. 5A shows a top, cross-sectional view of a containment cover with an integral tapered flow passage and without an annular ring, according to a further example embodiment.

As shown in FIG. 5A, a containment cover 502 with an integral tapered single flow passage 504 is shown, according to another example embodiment. The containment cover 502 is similar to the containment cover 302 of FIG. 3A. A difference between the containment cover 502 and the containment cover 302 is the containment cover 502 is aligned with the outlet 108, is without an annular passage, and has a single flow passage. Accordingly, like numbering is used to designate like parts between the containment cover 502 and the containment cover 302. As shown in FIG. 5, the containment cover 502 includes a central opening (e.g., cover opening) 510 in fluid communication with a flow passage (e.g., duct) 504. When the containment cover 502 is properly installed in the housing 104, the flow passage 504 extends in a radial direction that is substantially parallel to a longitudinal axis 550 (defined by the outlet 108) of the containment cover 502. In other words, the flow passage 504 defines a radius of the containment cover 502. The flow passage 504 extends in a radial direction substantially perpendicular to the face of the outlet 108. The flow passage 504 includes an end in fluid communication with the central opening 510 and an end in fluid communication with the outlet 108. As is readily apparent, due to the passage alignment, the flow passage 504 is in direct fluid communication with the outlet 108. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

Beneficially, the containment cover 502 includes a tapered, single flow passage 504. The term "tapered" refers to an increasing cross section of the flow passage 504 as it gets further from the central opening 510. The flow passage 504 is formed by a first passage wall 507 and a second passage wall 508 that extends radially outward from the central opening 510 to the outlet 108. As will be appreciated, the term "passage wall" includes substantially curved (e.g., c-shaped, v-shaped, etc.) surfaces that facilitate the flow of fluid therethrough. The first passage wall 507 and the second passage wall 508 are slightly angled or tapered by a draft angle 506 with respect to the outlet 108. As used herein, the term "draft angle" refers to the angle formed by a parting line 542 between the first passage wall 507 and the second passage wall 508. As will be appreciated, because the passage walls 507, 508 do not extend past the central opening 510, the parting line 542 is the imaginary location where the first passage wall 507 and second passage wall 508 meet if both were to extend past the central opening 510. In some arrangements, the draft angle 506 is approximately 45 degrees; in other arrangements, the draft angle 506 is such that it causes the two passage walls 507, 508 to be adjacent to or angled toward the ends of the outlet 108 opening. As shown in FIG. 5A, the first passage wall 507 is angled, creating a gap 509 between the first passage wall 507 and the outlet 108. An inner surface of the housing 104 provides a sealing surface between the containment cover 502 and outlet 108 at the gap 509. Similarly, the second passage wall 508 is angled, creating a gap 511 between the second passage wall 508 and the outlet 108. An inner surface of the housing 104 provides a sealing surface between the containment cover 502 and outlet 108 at the gap 511. In some embodiments, the gaps 509, 511 may be larger or smaller to facilitate filtered fluid flow 520 to the outlet 108 under certain operating conditions. While both passage walls 507, 508 are angled, in some arrangements, the first passage wall 507 is angled or tapered with respect to the second passage wall 508, with the second passage wall 508 being substantially straight.

The containment cover 502 does not include an annular passage (e.g., annular ring). Accordingly, a surface 514 is substantially continuous around the circumference of the containment cover 502 with a portion—formed by the draft angle 506—open for fluid communication with the flow passage 504. A semicircular portion 516 is formed between the first passage wall 507, the second passage wall 508, and the surface 514 (which may possess a curved, hemispherical contour in particular embodiments). The semicircular portion 516 may be substantially solid or open. In some arrangements, the bottom of the semicircular portion 516 is attached to the filter element 110 in place of the second endplate 206. As will be appreciated, the fluid filtered by the filter element 110 enters the central opening 510 of the containment cover 502 and travels through the flow passage 504 directly to the outlet 108.

In some embodiments, the flow passage 504 may include indentations along the various surfaces that form them to bias the filtered fluid flows 520 therethrough. For example, a v-shaped indentation angled toward the outlet 108 to bias the filtered fluid flow 520 to the outlet 108. A wide variety of protrusions, indentations, or biasing surfaces may be disposed along or at the end of the flow passage 504 to bias filtered fluid flow 520. Due to the increased area of the tapering and alignment of the flow passage 504 with the outlet 108 a reduction in pressure drop—compared to conventional lids—and reduction the overall pressure drop across the containment cover 502 is achieved.

Figure 5B:
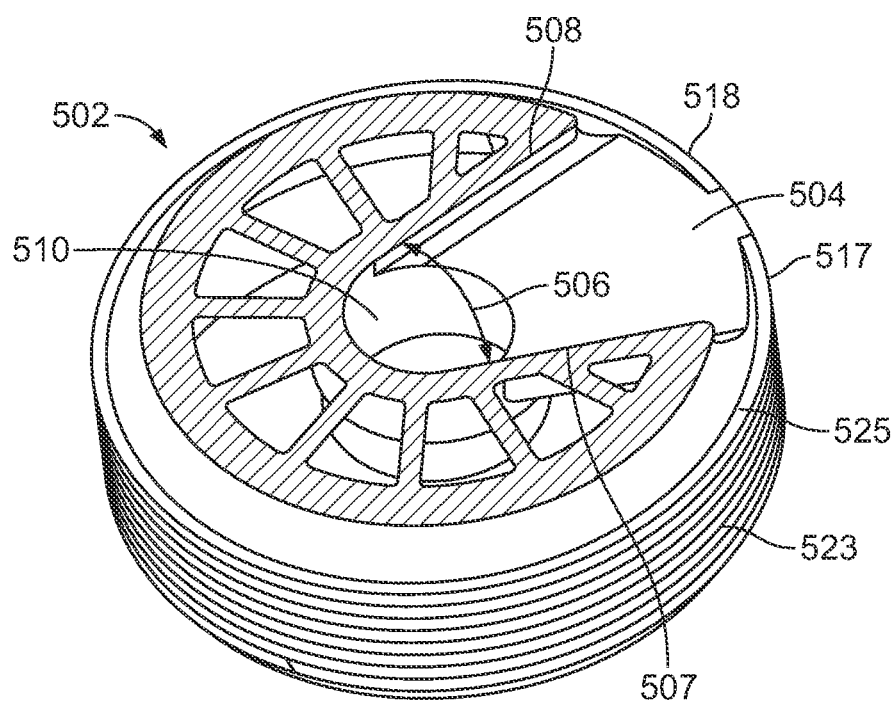
FIG. 5B shows a perspective view of the containment cover of FIG. 5A.

FIG. 5B shows a perspective view of the containment cover 502 of FIG. 5A. The containment cover 502 includes a first coupling member 523 and a second coupling member 525. While shown as a threaded end in FIG. 5B, alternative coupling members may be implemented (e.g., snap-fit, press fit, etc.) on the first coupling member 523 and the second coupling member 525. Depending on the configuration, the first coupling member 523 allows for sealing engagement with the housing 104. The second coupling member 525 allows for sealing engagement with a lid 524. Further, the containment cover 502 includes a first rib 517 extending from the end of the first passage wall 507 circumferentially towards the outlet 108. The first rib 517 is configured to guide the filtered fluid flow 520 toward the outlet 108, for example, in situations where the gap 509 exists. Similarly, the containment cover 502 includes a second rib 518 extending from the end of the second passage wall 508 circumferentially towards the outlet 108. The second rib 518 is configured to guide the filtered fluid flow 520 toward the outlet 108, for example, in situations where the gap 511 exists. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

Figure 5C:
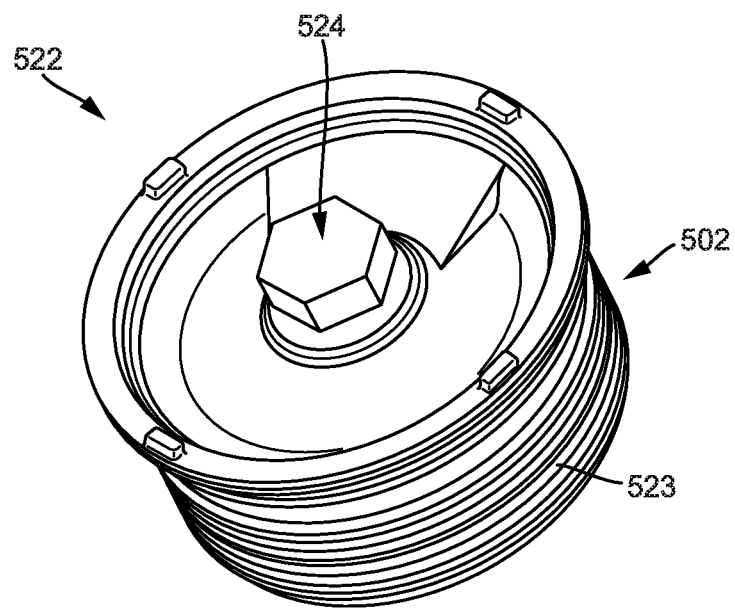
FIG. 5C shows a perspective view of the containment cover of FIG. 5A with a lid.
Figure 5D:
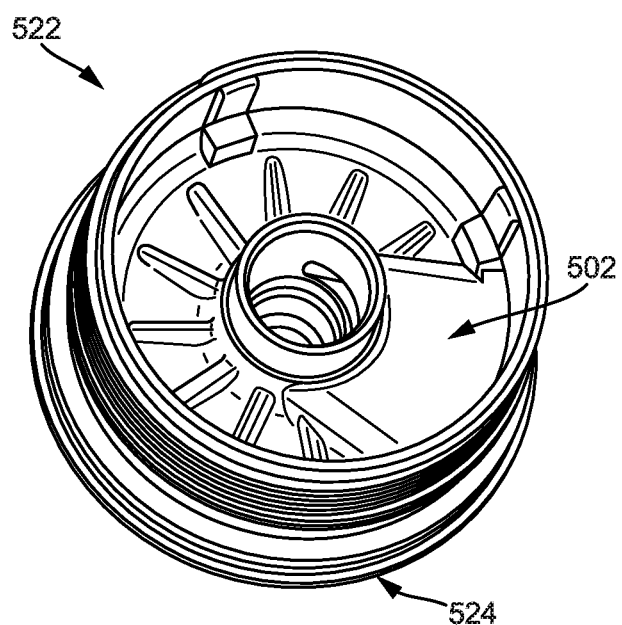
FIG. 5D shows a bottom, perspective view of the containment cover of FIG. 5C.

FIG. 5C shows a perspective view of the containment cover 502 of FIG. 5A with the lid 524 disposed on the top of the containment cover 502. The engagement between the lid 524 and containment cover 502 comprises a snap-fit, press fit, torsion, or similar engagement mechanism at the second coupling member 525. In some arrangements, the lid 524 is overmolded on the containment cover 502 to form a single, cohesive unit. As shown in FIG. 5C, the lid 524 is torsionally installed over the threaded second coupling member 525 of the containment cover 502 to form a coupled lid 522. FIG. 5D shows a bottom, perspective view of the coupled lid 522 of FIG. 5C. As will be appreciated in comparison to FIG. 5F below, the coupled lid 522 does not include a bottom member of the lid 524 (e.g., a bottom member similar to the bottom member 526 of FIG. 5E below). In some arrangements, a bottom member is not necessary for use of the coupled lid 522 in a filtration system.

Figure 5E:
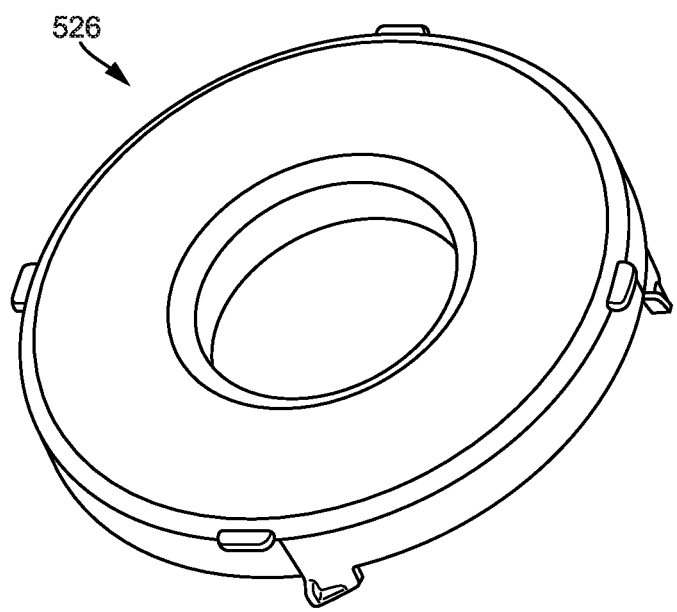
FIG. 5E shows a perspective view of a bottom member of the containment cover of FIG. 5D.

FIG. 5E shows a perspective view of a bottom member 526 of the lid 524 of FIG. 5D. The bottom member 526 is removably coupled to the bottom of the containment cover 502 of FIG. 5A. As shown in FIG. 5E, the bottom member 526 includes tabs for a snap-fit or press fit engagement with the bottom of the containment cover 502. In some arrangements, the bottom member 526 provides sealing engagement of the filter element 110 in place of the second endplate 206.

Figure 5F:
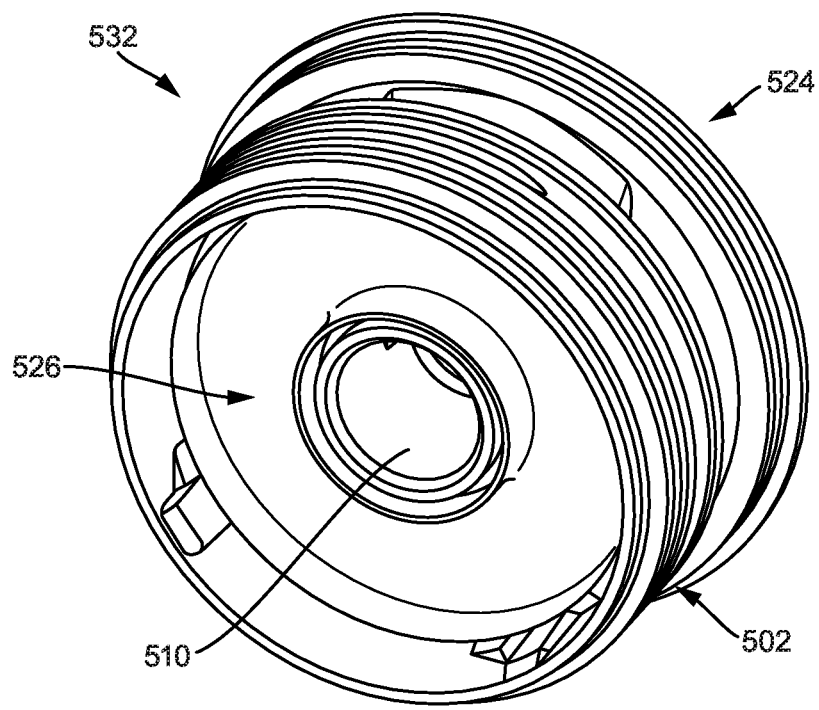
FIG. 5F shows a perspective view of the containment cover with a lid and bottom member.

FIG. 5F shows a perspective view of the containment cover 502 coupled with a lid 524 and bottom member 526.

Figure 6:
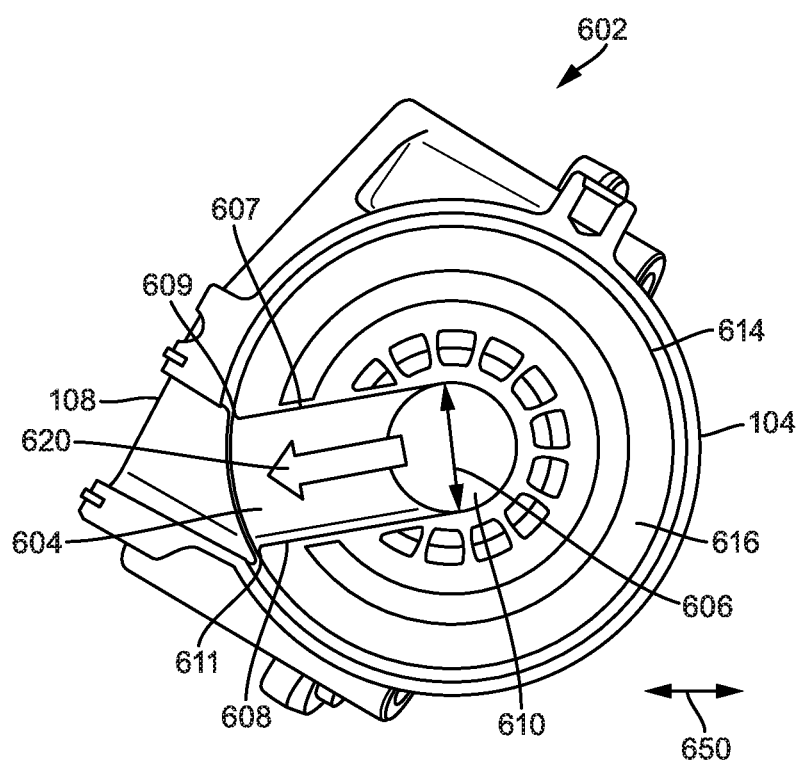
FIG. 6 shows a top, cross-sectional view of a containment cover with an integral straight flow passage without an annular ring in a filtration system, according to another example embodiment.

Turning to FIG. 6, a containment cover 602 with an integral straight-line single flow passage 604 is shown, according to a further example embodiment. The containment cover 602 is similar to the containment cover 502 of FIG. 5A. A difference between the containment cover 602 and the containment cover 502 is the containment cover 602 is not tapered and has a substantially parallel pair of passage walls. Accordingly, like numbering is used to designate like parts between the containment cover 602 and the containment cover 502. As shown in FIG. 6, the containment cover 602 includes a central opening (e.g., cover opening) 610 in fluid communication with a flow passage (e.g., duct) 604. When the containment cover 302 is properly installed in the housing 104, the flow passage 604 extends in a radial direction that is substantially parallel to a longitudinal axis 650 (defined by the outlet 108) of the containment cover 602. In other words, the flow passage 604 defines a radius of the containment cover 602. The flow passage 604 extends in a radial direction substantially perpendicular to the face of the outlet 108. The flow passage 604 includes an end in fluid communication with the central opening 610 and an end in fluid communication with the outlet 108. As is readily apparent, due to the passage alignment, the flow passage 604 is in direct fluid communication with the outlet 108. While not shown, a lid may be overmolded or removably coupled to the containment cover 602, similar to the containment cover 502 of FIG. 5B. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

Beneficially, the containment cover 602 includes a substantially straight-line, single flow passage 604. The flow passage 604 is formed by a first passage wall 607 and a second passage wall 608 that extend radially outward from the central opening 610 to the outlet 108. The term "straight-line" refers to the passage walls 607, 608 being substantially straight, without any curves along the path of travel by the fluid flow 620 through the flow passage 604. The two passage walls 607, 608 are substantially parallel to each other. In other words, the two passage walls 607, 608 form a tangent line extending from the central opening 610 toward the outlet 108. The first passage wall 607 is aligned with an edge 609 of the outlet 108 such that no gap exists (e.g., an inner surface of the housing 104 is not needed to provide sealing engagement at gaps such as in the containment cover 502). Similarly, the second passage wall 608 is aligned with an edge 611 of the outlet 108 such that no gap exists. In some embodiments, the width of the straight-line flow passage 604 is increased to accommodate a greater volume of flow 620 through the containment cover 602. In those embodiments, a gap may form at either side 609, 611 of the outlet 108 such that some of the filtered fluid flow 620 contacts an inner surface of the housing 104. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

The containment cover 602 does not include an annular passage (e.g., annular ring). Accordingly, a surface 614 (which may possess a curved, hemispherical contour in particular embodiments) is substantially continuous around the circumference of the containment cover 602 with a portion—formed by the width 606 of the flow passage 604—open for fluid communication with the flow passage 604. A semicircular portion 616 is formed between the first passage wall 607, the second passage wall 608, and the surface 614. The semicircular portion 616 may be substantially solid or open. In some arrangements, the bottom of the semicircular portion 616 is attached to the filter element 110 in place of the second endplate 206. As will be appreciated, the fluid filtered by the filter element 110 enters the central opening 610 of the containment cover 602 and travels through the flow passage 604 directly to the outlet 108. In some embodiments, the flow passage 604 may include indentations along the various surfaces that form them to bias the filtered fluid flows 620 therethrough. For example, a v-shaped indentation angled toward the outlet 108 to bias the filtered fluid flow 620 to the outlet 108. A wide variety of protrusions, indentations, or biasing surfaces may be used along or at the end of the flow passage 604 to bias filtered fluid flow 620. Due to the substantially straight-line shape of the flow passage 604 and the alignment of the flow passage 604 with the outlet 108 a reduction in pressure drop—compared to conventional lids—and a reduction the overall pressure drop across the containment cover 602 is achieved.

Figure 7A:
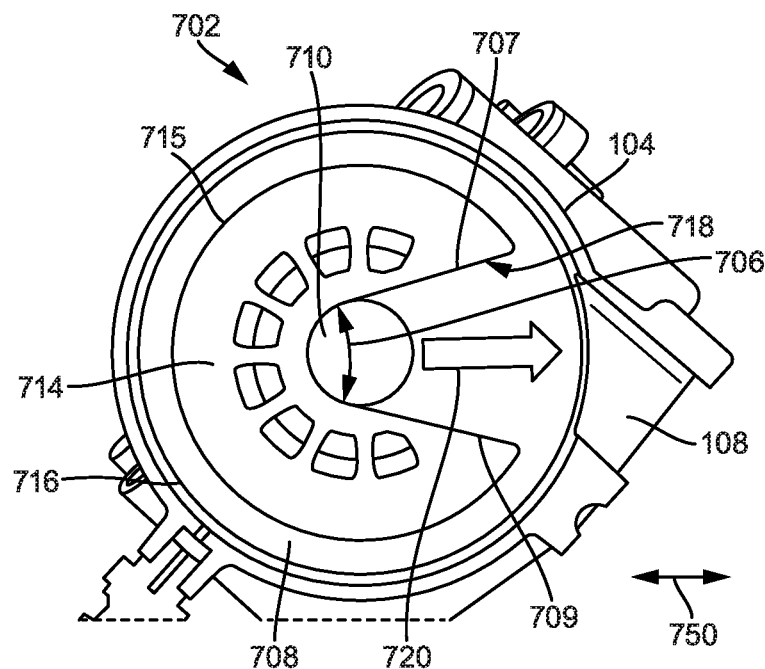
FIG. 7A shows a top, cross-sectional view of a containment cover with an integral tapered flow passage and an annular ring, according to a further example embodiment.

A containment cover 702 with an integral tapered flow structure 704 and an annular passage 708 is shown in FIG. 7A, according to an example embodiment. The containment cover 702 is similar to the containment cover 502 of FIG. 5A. A difference between the containment cover 702 and the containment cover 502 is the containment cover 702 includes an annular passage and a flared first wall 707. Accordingly, like numbering is used to designate like parts between the containment cover 702 and containment cover 502. As shown in FIG. 7, the containment cover 702 includes a central opening (e.g., cover opening) 710 in fluid communication with a flow passage (e.g., duct) 704. When the containment cover 702 is properly installed in the housing 104, the flow passage 704 extends in a radial direction that is substantially parallel to a longitudinal axis 750 (defined by the outlet 108) of the containment cover 702. In other words, the flow passage 704 defines a radius of the containment cover 702. The flow passage 704 extends in a radial direction substantially perpendicular to the face of the outlet 108. The flow passage 704 includes an end in fluid communication with the central opening 710 and an end in direct fluid communication with an annular passage 708. As is readily apparent, due to the passage alignment, the flow passage 704 is in fluid communication with the outlet 108 by passing through the annular passage 708. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

The annular passage 708 is a circumferentially continuous passage provided in the containment cover 702 adjacent to a perimeter edge of the containment cover 702. The annular passage 708 is formed by a pair of concentric surfaces, a first surface 716 and a second surface 715 (both of which may possess a curved, hemispherical contour) spaced inward from the first surface 716. The second surface 715 is substantially continuous around the circumference, with portions open for fluid communication with the flow passage 704. The second surface 715 forms the perimeter edge of the containment cover 702 and comprises a substantially circular cross-section (e.g., c-shaped) having a side opening in the direction of the first surface 716 (e.g., towards an inner surface of the housing 104). The first surface 716 is substantially continuous around the circumference, with a portion of the first surface 716 open for fluid communication with the outlet 108. The first surface 716 is provided by an inner surface of the housing 104, wherein the installation of the containment cover 702 into the housing 104 forms a sealing engagement with the second surface 715 of the containment cover 702 and formation of the annular passage 708. In other words, the side opening of the second surface 715 is sealingly closed by the inner surface of the housing 104 when the containment cover 702 is installed into the housing 104. In some embodiments, the first surface 716 is formed on the containment cover 702. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

A semicircular portion 714 is formed between the first passage wall 707, second passage wall 709, the central opening 710, and the second surface 715. The semicircular portion 714 is substantially continuous around the circumference of the second surface 715 with a portion—formed by the draft angle 706—open for fluid communication of the flow passage 704. The semicircular portion 714 may be substantially solid or open. In some arrangements, the bottom of the semicircular portion 714 is attached to the filter element 110 in place of the second endplate 206.

Figure 7B:
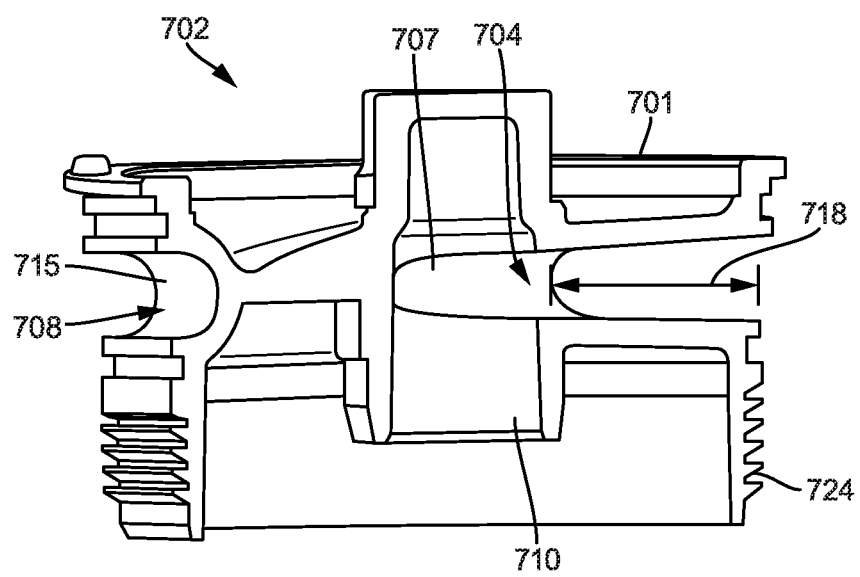
FIG. 7B shows a cross-sectional view of the containment cover of FIG. 7A.

Beneficially, the containment cover 702 includes an integrally formed tapered, single flow passage 704. The term "tapered" refers to an increasing cross section of the flow passage 704 as it gets further from the central opening 710. The flow passage 704 is formed by a first passage wall 707 and a second passage wall 709 that extend radially outward from the central opening 710 to the outlet 108. As will be appreciated, the term "passage wall" includes substantially curved (e.g., c-shaped, v-shaped, etc.) surfaces that facilitate the flow of fluid therethrough. The first passage wall 707 and the second passage wall 709 are slightly angled or tapered by a draft angle 706 with respect to the outlet 108. In some arrangements, the draft angle 706 is approximately 45 degrees; in other arrangements, the draft angle 706 is such that it causes the two passage walls 707, 709 to be adjacent to or angled toward the ends of the outlet 108 opening. While both passage walls 707, 709 are angled, in some arrangements, the first passage wall 707 is angled or tapered with respect to the second passage wall 709, with the second passage wall 709 being substantially straight (e.g., a tangent line extending from the central opening). As shown in FIG. 7B, the first passage wall 707 is flared (e.g., fanned, having a larger opening) in the counterclockwise direction such that a flared gap 718 is formed. The term "flared" refers to the first passage wall 707 opening more abruptly in the counterclockwise direction towards the annular passage, such that there is an increasing cross section cross section of the flow passage 704, expanding quicker on the side of the first passage wall 707. The flared gap 718 facilitates fluid flow 720 toward the outlet 108 or in the counterclockwise around the annular passage 708.

FIG. 7B shows a perspective view of the containment cover 702 of FIG. 7A. The containment cover 702 includes a coupling member 724 for coupling with the housing 104. While shown as a threaded end in FIG. 7B, alternative coupling members may be implemented (e.g., snap-fit, press fit, etc.). Depending on the configuration, the coupling member 724 allows for sealing engagement with a lid or housing 104. Further, the flared gap 718 on the first passage wall 707 that facilitates fluid flow 720 toward the outlet 108 or in the counterclockwise around the annular passage 708 is shown. Additionally, the containment cover 702 includes a lid 701.

As will be appreciated, the fluid filtered by the filter element 110 enters the central opening 710 of the containment cover 702 and travels through the flow passage 704. The filtered fluid flows 720 through the flow passage 704 and travels directly through the outlet 108 or—due to the flared gap 718 on the first passage wall—travels counterclockwise around the annular passage 708 to the outlet 108. Under certain conditions, the filtered fluid flows 720 flows clockwise around the annular passage 708 to the outlet 108. Beneficially, under certain conditions (e.g., temperature, flow rate, pressure, etc.), the tapering and alignment of the flow passage 704 with the outlet 108 reduces pressure drop—compared to conventional lids—and reduces the overall pressure drop across the containment cover 702.

Figure 8:
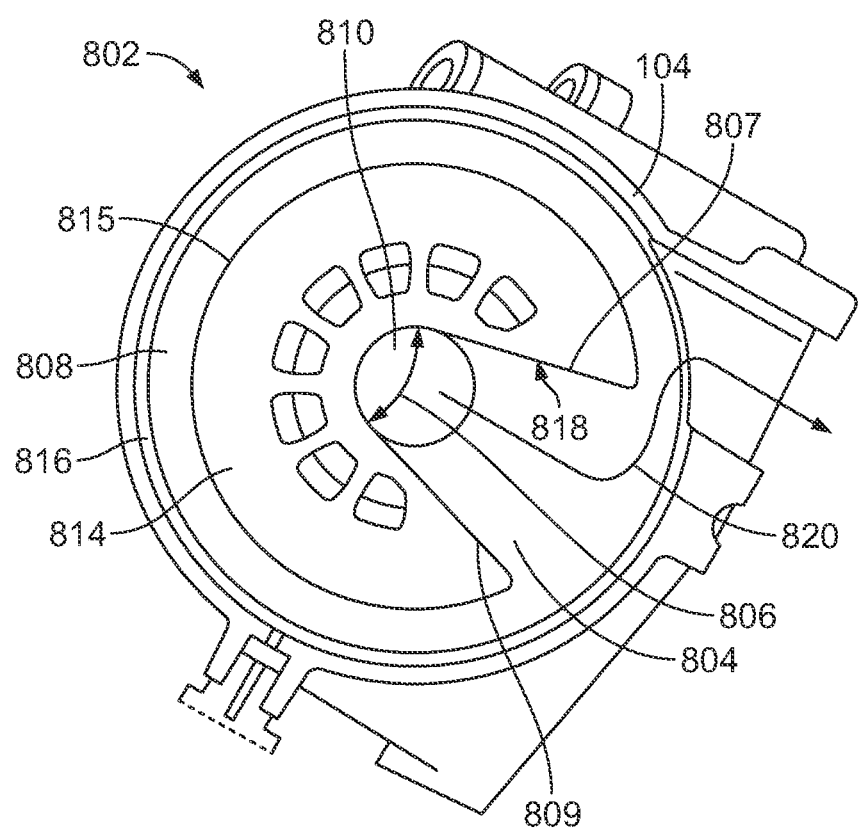
FIG. 8 shows a top, cross-sectional view of a containment cover with an angled integral tapered flow passage, according to yet another example embodiment.

Turning to FIG. 8, a containment cover 802 with an angled integral tapered flow passage 804 with an annular passage 808 is shown, according to a further example embodiment. The containment cover 802 is similar to the containment cover 702 of FIG. 7A. A difference between the containment cover 802 and the containment cover 702 is the containment cover 802 is rotated 45 degrees clockwise from the configuration of the containment cover 702. Accordingly, like numbering is used to designate like parts between the containment cover 802 and the containment cover 702. As shown in FIG. 8, the containment cover 802 includes a central opening (e.g., cover opening) 810 in fluid communication with a flow passage (e.g., duct) 804. When the containment cover 802 is properly installed in the housing 104, the flow passage 804 extends in a radial direction that is substantially perpendicular to a longitudinal axis (defined by the outlet 108) of the containment cover 802. In other words, the flow passage 804 defines a radius of the containment cover 802. The flow passage 804 extends in a radial direction substantially parallel to the face of the outlet 108. The flow passage 804 includes an end in fluid communication with the central opening 810 and an end in direct fluid communication with an annular passage 808. The tapered flow passage 804 is angled 45 degrees in a clockwise direction away from the outlet 108 face. As is readily apparent, due to the passage alignment, the flow passage 804 is in fluid communication with the outlet 108 by passing through the annular passage 808. As will be appreciated, while the flow passages and/or flow surfaces are described as "substantially parallel" or "substantially perpendicular," the flow passages and/or flow surfaces may be embodied in orientations different (e.g., rotated clockwise by an amount) from those described in the embodiments below without departing from the spirit or novel characteristic thereof.

The annular passage 808 is a circumferentially continuous passage provided in the containment cover 802 adjacent to a perimeter edge of the containment cover 802. The annular passage 808 is formed by a pair of concentric surfaces, a first surface 816 and a second surface 815 spaced inward from the first surface 816. Again, the first surface 816 and the second surface 815 may possess a curved, hemispherical contour. The second surface 815 is substantially continuous around the circumference, with portions open for fluid communication with the flow passage 804. The second surface 815 forms the perimeter edge of the containment cover 802 and comprises a substantially circular cross-section (e.g., c-shaped) having a side opening in the direction of the first surface 816 (e.g., towards an inner surface of the housing 104). The first surface 816 is substantially continuous around the circumference, with a portion of the first surface 816 open for fluid communication with the outlet 108. The first surface 816 is provided by an inner surface of the housing 104, wherein the installation of the containment cover 802 into the housing 104 forms a sealing engagement with the second surface 815 of the containment cover 802 and formation of the annular passage 808. In other words, the side opening of the second surface 815 is sealingly closed by the inner surface of the housing 104 when the containment cover 802 is installed into the housing 104. In some embodiments, the first surface 816 is formed on the containment cover 802. Similar to FIGS. 1A and 1B, the first housing opening 106 of the housing 104 defines an inlet for receiving fluid to be filtered and the second housing opening defines an outlet for filtered fluid. In some embodiments, the flow through the housing 104 may be reversed, such that the first housing opening 106 is an outlet and the second housing opening 108 is an inlet.

A semicircular portion 814 is formed between the first passage wall 807, second passage wall 809, the central opening 810, and the second surface 815. The semicircular portion 814 is substantially continuous around the circumference of the second surface 815 with a portion—formed by the draft angle 806—open for fluid communication of the flow passage 804. The semicircular portion 814 may be substantially solid or open. In some arrangements, the bottom of the semicircular portion 814 is attached to the filter element 110 in place of the second endplate 206.

Beneficially, the containment cover 802 includes an integrally formed tapered, single flow passage 804. The term "tapered" refers to an increasing cross section of the flow passage 804 as it gets further from the central opening 810. The flow passage 804 is formed by a first passage wall 807 and a second passage wall 809 that extends radially outward from the central opening 810 to the outlet 108. As will be appreciated, the term "passage wall" includes substantially curved (e.g., c-shaped, v-shaped, etc.) surfaces that facilitate the flow of fluid therethrough. The first passage wall 807 and the second passage wall 809 are slightly angled or tapered by a draft angle 806 with respect to the outlet 108. In some arrangements, the draft angle 806 is approximately 45 degrees; in other arrangements, the draft angle 806 is such that it causes the two passage walls 807, 809 to be adjacent to or angled toward the ends of the outlet 108 opening. While both passage walls 807, 809 are angled, in some arrangements, the first passage wall 807 is angled or tapered with respect to the second passage wall 809, with the second passage wall 809 being substantially straight (e.g., a tangent line extending from the central opening). As shown in FIG. 7B, the first passage wall 807 is flared (e.g., fanned, having a larger opening) in the counterclockwise direction such that a flared gap 818 is formed. The term "flared" refers to the first passage wall 807 opening more abruptly in the counterclockwise direction towards the annular passage, such that there is an increasing cross section cross section of the flow passage 804, expanding quicker on the side of the first passage wall 807. The flared gap 818 facilitates fluid flow 820 toward the outlet 108 or in the counterclockwise around the annular passage 808.

Although not shown in FIG. 8, the containment cover 802 may include a coupling member for coupling with the housing 104. The coupling member includes a threaded end or an alternative coupling member (e.g., snap-fit, press fit, etc.). Depending on the configuration, the coupling member allows for sealing engagement with a lid or housing 104. Further, the flared gap 818 on the first passage wall 807 that facilitates fluid flow 820 toward the outlet 108 or in the counterclockwise around the annular passage 808 is shown. Additionally, the containment cover 802 includes a lid.

As will be appreciated, the fluid filtered by the filter element 110 enters the central opening 810 of the containment cover 802 and travels through the flow passage 804. The filtered fluid flows 820 through the flow passage 804 and travels—due to the flared gap 818 on the first passage wall—counterclockwise around the annular passage 808 to the outlet 108. Under certain conditions, the filtered fluid flows 820 flows clockwise around the annular passage 808 to the outlet 108. Beneficially, under certain conditions (e.g., temperature, flow rate, pressure, etc.), the tapering and alignment of the flow passage 804 with the outlet 108 reduces pressure drop—compared to conventional lids—and reduces the overall pressure drop across the containment cover 802.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes. Additionally, biasing member discussed for a particular embodiment, for example the containment cover 302, can be used in other embodiments, for example, the containment cover 402 to increase flow efficiency and limit pressure drop throughout the containment cover.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration assembly, the filtration assembly comprising:
   a housing comprising a first housing opening and a second housing opening; and
   a containment cover removably coupled to the housing, the containment cover defining a cover opening that is in fluid communication with the housing, a cover surface, a flow passage, and an annular passage,
   the cover surface substantially continuous around a circumference of the containment cover and comprising an open portion in fluid communication with the second housing opening,
   the annular passage substantially continuous around a circumference of the containment cover, and
   the flow passage formed by a first passage surface and a second passage surface, the flow passage comprising a first end in fluid communication with the cover opening and a second end in fluid communication with the second housing opening and the annular passage through the open portion of the cover surface, the flow passage extending radially outward from the cover opening.

2. The filtration assembly of claim 1, wherein the cover surface comprises a first cover surface and the annular passage is formed by the first cover surface and a second cover surface, the second cover surface spaced inward from the first cover surface, wherein the flow passage is in fluid communication with the second housing opening by passing through the annular passage.

3. The filtration assembly of claim 2, wherein the flow passage comprises a first flow passage, the containment cover further comprising:
   a second flow passage formed by a third passage surface and a fourth passage surface, the second flow passage extending radially outward from the cover opening in a direction opposite from the first flow passage, the second flow passage comprising a third end and fourth end, the third end in fluid communication with the cover opening and the second end in fluid communication with the second housing opening by passing through the annular passage,
   wherein the first flow passage and second flow passage define a diameter of the second cover surface.

4. The filtration assembly of claim 3, wherein the first passage surface is substantially parallel to the second passage surface and the third passage surface is substantially parallel to the fourth passage surface, and wherein the first flow passage and the second flow passage extend in a direction that is substantially parallel to a face of the second housing opening.

5. The filtration assembly of claim 3, wherein the first passage surface is substantially parallel to the second passage surface and the third passage surface is substantially parallel to the fourth passage surface, and wherein the first flow passage and the second flow passage extend in a direction that is substantially perpendicular to a face of the second housing opening.

6. The filtration assembly of claim 1, wherein the first passage surface and second passage surface are adjacent to edges of the open portion.

7. The filtration assembly of claim 2, wherein the first passage surface is tapered with respect to the second passage surface at a non-perpendicular draft angle, the draft angle defining the flow passage, the flow passage being in fluid communication with the second housing opening by passing through the annular passage, wherein each of the first passage surface and second passage surface define a radius of the second cover surface.

8. The filtration assembly of claim 7, wherein the draft angle is structured to have the first passage surface and the second passage surface align with the open portion of the first cover surface.

9. The filtration assembly of claim 7, wherein the first passage surface includes a flared gap extending in a counterclockwise direction, the flared gap facilitating fluid flow counterclockwise around the annular passage toward the second housing opening.

10. The filtration assembly of claim 2, wherein the second cover surface is formed by an inner surface on the housing when the containment cover is installed with the housing.

11. The filtration assembly of claim 1, wherein the first passage surface is tapered with respect to the second passage surface at a non-perpendicular draft angle, the draft angle defining the flow passage.

12. The filtration assembly of claim 1, wherein the flow passage extends in a direction that is substantially perpendicular to a face of the second housing opening and the first passage surface is substantially parallel to the second passage surface, and wherein the first passage surface and second passage surface comprise outside edges of the open portion.

13. The filtration assembly of claim 1, wherein the flow passage extends in a direction that is substantially perpendicular to a face of the second housing opening and the first passage surface is substantially parallel to the second passage surface, and wherein the first passage surface and second passage surface comprise inside edges of the open portion.

14. The filtration assembly of claim 1, wherein first housing opening is a fluid inlet for fluid to be filtered and the second housing opening is a fluid outlet for filtered fluid, and wherein the flow passage comprises a biasing member on the second end, the biasing member configured to bias the filtered fluid toward the second housing opening.

15. The filtration assembly of claim 14, wherein first housing opening is a fluid inlet for fluid to be filtered and the second housing opening is a fluid outlet for filtered fluid, and wherein the biasing member comprises a curved indentation on the second end of the flow passage, the curved indentation angled so as to bias the filtered fluid toward the second housing opening.

16. The filtration assembly of claim 14, wherein the biasing member comprises a v-shaped protrusion on the second end of the flow passage, the v-shaped protrusion configured to facilitate filtered fluid out of the flow passage and into the second housing opening.

17. The filtration assembly of claim 1, wherein the first passage surface is tapered with respect to the second passage surface at a non-perpendicular draft angle, the draft angle defining the flow passage, the flow passage being in direct fluid communication with the second housing opening by passing through the open portion of the cover surface, wherein each of the first passage surface and second passage surface define a radius of the cover surface.

18. A filtration assembly, the filtration assembly comprising:
    a housing comprising a first housing opening and a second housing opening;
    a fluid filter element removably installed within the housing, the fluid filter element comprising filtration media comprising a filtered fluid side, an unfiltered fluid side, and a center compartment; and
    a containment cover removably coupled to the housing, the containment cover defining a cover opening in fluid communication with the center compartment of the filtration media, a cover surface, a flow passage, and an annular passage,
    the cover surface substantially continuous around a circumference of the containment cover and comprising an open portion in fluid communication with the second housing opening of the housing,
    the annular passage substantially continuous around a circumference of the containment cover, and
    the flow passage formed by a first passage surface and a second passage surface, the flow passage comprising a first end in fluid communication with the cover opening and a second end in fluid communication with the second housing opening and the annular passage through the open portion of the cover surface, the flow passage extending radially outward from the cover opening.

19. The filtration assembly of claim 18, wherein the containment cover is integrally formed on the fluid filter element.

20. The filtration assembly of claim 18, wherein the flow passage extends perpendicular to a longitudinal axis of the filtration media.

21. The filtration assembly of claim 18, wherein the cover surface comprises a first cover surface and the annular passage is formed by the first cover surface and a second cover surface, the second cover surface spaced inward from the first cover surface, wherein the flow passage is in fluid communication with the second housing opening by passing through the annular passage.

22. The filtration assembly of claim 21, wherein the flow passage comprises a first flow passage, the containment cover further comprising:
    a second flow passage formed by a third passage surface and a fourth passage surface, the second flow passage extending radially outward from the cover opening in a direction opposite from the first flow passage, the second flow passage comprising a third end and fourth end, the third end in fluid communication with the cover opening and the second end in fluid communication with the second housing opening passing through the annular passage,
    wherein the first flow passage and second flow passage define a diameter of the second cover surface.

23. The filtration assembly of claim 21, wherein the first passage surface is tapered with respect to the second passage surface at a non-perpendicular draft angle, the draft angle defining the flow passage, the flow passage being in fluid communication with the second housing opening by passing through the annular passage, wherein each of the first passage surface and second passage surface define a radius of the second cover surface.

24. The filtration assembly of claim 18, wherein the flow passage extends in a direction that is substantially perpendicular to a face of the second housing opening and the first passage surface is substantially parallel to the second passage surface, and wherein the first passage surface and second passage surface comprise outside edges of the open portion.

25. The filtration assembly of claim 18, wherein the flow passage extends in a direction that is substantially perpendicular to a face of the second housing opening and the first passage surface is substantially parallel to the second passage surface, and wherein the first passage surface and second passage surface comprise inside edges of the open portion.

* * * * *